United States Patent
Matusz (10) Patent No.: US 7,415,656 B2
(45) Date of Patent: Aug. 19, 2008

(54) TECHNIQUES TO PRESERVE BANDWIDTH IN A COMMUNICATION SYSTEM

(75) Inventor: Pawel Oskar Matusz, Pomorskie (PL)

(73) Assignee: Intel Corporation, Santa Clara, CA (US)

( * ) Notice: Subject to any disclaimer, the term of this patent is extended or adjusted under 35 U.S.C. 154(b) by 526 days.

(21) Appl. No.: 10/952,032

(22) Filed: Sep. 27, 2004

(65) Prior Publication Data

US 2006/0068804 A1    Mar. 30, 2006

(51) Int. Cl.
*H03M 13/00* (2006.01)

(52) U.S. Cl. .................. 714/776; 714/779; 714/758

(58) Field of Classification Search .............. 714/758, 714/776, 779
See application file for complete search history.

(56) References Cited

U.S. PATENT DOCUMENTS

| | | | | |
|---|---|---|---|---|
| 5,361,266 A | * | 11/1994 | Kodama et al. | 714/758 |
| 5,691,997 A | * | 11/1997 | Lackey, Jr. | 714/807 |
| 6,307,890 B1 | * | 10/2001 | Dyson et al. | 375/265 |
| 2001/0004355 A1 | | 6/2001 | Galyas et al. | |
| 2005/0020216 A1 | * | 1/2005 | Bune | 714/758 |

FOREIGN PATENT DOCUMENTS

| | | |
|---|---|---|
| EP | 1 487 143 A1 | 12/2004 |
| WO | WO 01/73973 A1 | 10/2001 |
| WO | WO 2004/002082 A1 | 12/2003 |

OTHER PUBLICATIONS

PCT International Search Report, International Application No. PCT/US2005/033360, Date of Completion: Jan. 24, 2006, Date of Mailing: Feb. 2, 2006, pp. 1-5.

* cited by examiner

*Primary Examiner*—M. Mujtaba K Chaudry
(74) *Attorney, Agent, or Firm*—Kacvinsky LLC (57) ABSTRACT

A method and apparatus to preserve bandwidth in a communication system are described wherein a receiver receives a first frame of transport blocks from a mobile device and an error detection module connected to the receiver detects whether each transport block contains an error. The error detection module generates an error indicator value to indicate whether each transport block contains an error or does not contain an error. A frame generator connected to the error detection module generates a second frame with the transport blocks that do not contain an error and the error indicator values. A first network interface is configured to send the second frame to a radio network controller. Other embodiments are described and claimed.

20 Claims, 7 Drawing Sheets

TECHNIQUES TO PRESERVE BANDWIDTH IN A COMMUNICATION SYSTEM

BACKGROUND

A communication system typically communicates information between two or more end points. One design consideration for a communication system is the amount of bandwidth available to communicate the information. Typically, bandwidth is a particularly expensive factor in designing a communication system. Consequently, techniques to reduce bandwidth consumption or increase bandwidth efficiency may lead to improved system performance and lower costs for the system.

SUMMARY

A method and apparatus to preserve bandwidth in a communication system are described wherein a receiver receives a first frame of transport blocks from a mobile device and an error detection module connected to the receiver detects whether each transport block contains an error. The error detection module generates an error indicator value to indicate whether each transport block contains an error or does not contain an error. A frame generator connected to the error detection module generates a second frame with the transport blocks that do not contain an error and the error indicator values. A first network interface is configured to send the second frame to a radio network controller. Other embodiments are described and claimed.

DETAILED DESCRIPTION

Figure 1:
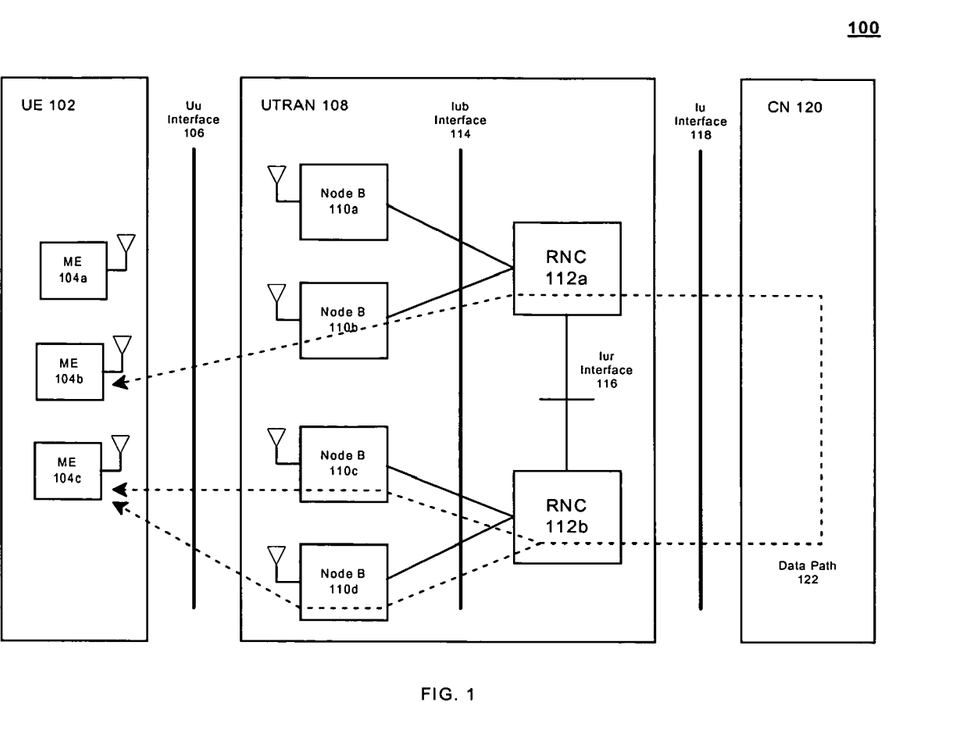
FIG. 1 illustrates a block diagram of a system 100.

FIG. 1 illustrates a block diagram of a system 100. System 100 may comprise, for example, a communication system having multiple nodes. A node may comprise any physical or logical entity having a unique address in system 100. Examples of a node may include, but are not necessarily limited to, a computer, server, workstation, laptop, ultra-laptop, handheld computer, telephone, cellular telephone, personal digital assistant (PDA), router, switch, bridge, hub, gateway, wireless access point (WAP), and so forth. The unique address may comprise, for example, a network address such as an Internet Protocol (IP) address, a device address such as a Media Access Control (MAC) address, and so forth. The embodiments are not limited in this context.

The nodes of system 100 may be connected by one or more types of communications media and input/output (I/O) adapters. The communications media may comprise any media capable of carrying information signals. Examples of communications media may include metal leads, printed circuit boards (PCB), backplanes, switch fabric, semiconductor material, twisted-pair wire, co-axial cable, fiber optics, radio frequency (RF) spectrum, and so forth. An information signal may refer to a signal which has been coded with information.

The I/O adapters may be arranged to operate with any suitable technique for controlling information signals between nodes using a desired set of communications protocols, services or operating procedures. The I/O adapters may also include the appropriate physical connectors to connect the I/O adapters with a corresponding communications media. Examples of an I/O adapter may include a network interface, a network interface card (NIC), radio/air interface, disc controllers, video controllers, audio controllers, and so forth. The embodiments are not limited in this context.

The nodes of system 100 may be configured to communicate different types of information, such as media information and control information. Media information may refer to any data representing content meant for a user, such as voice information, video information, audio information, text information, alphanumeric symbols, graphics, images, and so forth. Control information may refer to any data representing commands, instructions or control words meant for an automated system. For example, control information may be used to route media information through a system, or instruct a node to process the media information in a predetermined manner.

The nodes of system 100 may communicate media and control information in accordance with one or more protocols. A protocol may comprise a set of predefined rules or instructions to control how the nodes communicate information between each other. The protocol may be defined by one or more protocol standards as promulgated by a standards organization, such as the Internet Engineering Task Force (IETF), International Telecommunications Union (ITU), the Institute of Electrical and Electronics Engineers (IEEE), and so forth.

Referring again to FIG. 1, system 100 may comprise a Universal Mobile Telecommunication System (UMTS) as defined by the Third-Generation Partnership Project (3GPP) 3G TS line of specifications, for example. UMTS 100 may include various nodes operationally divided into three parts: User Equipment (UE) 102, UMTS Terrestrial Radio Access Network (UTRAN) 108, and Core Network (CN) 120. Although FIG. 1 illustrates a limited number of nodes in a given topology, it may be appreciated that UMTS 100 may have more or less nodes in any topology and still fall within the scope of the embodiments.

In one embodiment, UE 102 may include mobile equipment (ME) 104*a-c*. Examples of ME may include a cellular telephone, a laptop computer with a radio interface, a handheld computer such as a PDA with a radio interface, an integrated cellular telephone/PDA, and so forth. ME 104*a-c* may communicate information to Node B 110*a-d* of UTRAN 108 over a wireless communication medium, such as RF spectrum. UE 102 and Node B 110*a-d* may communicate using a Uu interface 106. Uu interface 106 may be an interface as defined by the 3GPP specification titled "Radio Resource Control (RRC) Protocol Specification," 3G TS 25-331, release 1999 ("Uu Specification"), for example.

In one embodiment, system 100 may include UTRAN 108. UTRAN 108 may handle the radio-related operations for system 100. UTRAN 108 may include Node B 110*a-d* and Radio Network Controller (RNC) 112*a-b*. Node B 110*a-d* may comprise base stations arranged to communicate information to ME 104*a-c* via Uu interface 106. As shown in FIG. 1, Node B 110*a* and Node B 110*b* may be connected to RNC 112*a*, while Node B 110*c* and Node B 110*d* may be connected to RNC 112*b*. Node B 110*a-d* may communicate with RNC 112*a-b* using an Iub interface 114. Iub interface 114 may be an interface as defined by the 3GPP specification titled "UTRAN Iub Interface: General Aspects and Principles," 3G TS 25-430, release 1999 ("Iub Specification"), for example. RNC 112a and RNC 112b may communicate using Iur interface 116. Iur interface 116 may be an interface as defined by the 3GPP specification titled "UTRAN Iur Interface: General Aspects and Principles," 3G TS 25-420, release 1999 ("Iur Specification"), for example.

In one embodiment, system 100 may include CN 120. CN 120 may be responsible for switching/routing information from UE 102 and UTRAN 108 to external networks. Examples of external networks may include a voice network such as the Public Switched Telephone Network (PSTN), or a data network such as the Internet. UTRAN 108 may communicate with CN 120 using an Iu interface 118. Iu interface 118 may be an interface as defined by the 3GPP specification titled "UTRAN Iu Interface: General Aspects and Principles," 3G TS 25-410, release 1999 ("Iu Specification"), for example.

In general operation, ME 104a-c of UE 102 may communicate media and control information to Node B 110a-d of UTRAN 108 via Uu interface 106. Node B 110a-d may receive the information and forward the information to RNC 112a-b via Iub interface 114. RNC 112a-b of UTRAN 108 may send the information to CN 120 via Iu Interface 116. All user, management and signaling data exchanged between the various UMTS elements are passed through the respective interfaces in the form of data frames. The data frames may include, among other fields, one or more transport blocks with corresponding error indicator values. An example of an error indicator value may comprise a cyclic redundancy check (CRC) indicator (CRCI). The embodiments are not limited in this context.

FIG. 1 may also illustrate a call connection for a call session (e.g., telephone call) between ME 104b and ME 104c. ME 104b may communicate information to ME 104c through a first portion of communication data path 122 that includes a single Node B 110b and RNC 112a of UTRAN 108. ME 104c may communicate information to ME 104b through a second portion of communication data path 122 that includes multiple Node B 110, such as Node B 110c and Node B 110d, and RNC 112b of URAN 108. The second portion of communication data path 122 for ME 104c may include multiple radio connections with UTRAN 108 to implement a technique referred to as "macro-diversity."

Macro-diversity is a technique used to lower the probability of receiving erroneous frames in UTRAN 108 and CN 120. A relatively large portion of bit errors in the second portion of communication data path 122 may occur on Uu interface 106 due to problems caused by signal fading, interference, diffraction, and so forth. Sending the same data through several radio links allows RNC 112a-b to combine correct received frames by choosing parts of the received frames (e.g., transport blocks) from the various radio links that were not distorted during communication. Each Node B 110a-d may be arranged to detect whether there was an error in each transport block received from ME 104a-c on the radio link by using an error detection technique, such as CRC. The receiving Node B 110a-d may perform error detection, and set a CRCI bit for each transport block in the data frame sent to RNC 112a-b. RNC 112a-b may then use the CRCI to perform macro-diversity combining by selecting those received transport blocks that have been correctly received and do not contain errors.

One problem associated with conventional implementations of macro-diversity techniques is that transport blocks with errors are sent between Node B 110a-d and RNC 112a-b. The bit error rate (BER) on Uu interface 106 typically varies from $10^{-9}$ to $10^{-6}$, and in some cases the BER can be even $10^{-3}$ or higher depending on radio conditions, movement of ME 104a-c, and so forth. Assuming a BER of $10^{-3}$ and a standard transport block length of 336 bits, statistically every third transport block may contain an error. Such transport blocks are marked by setting CRCI to "1" by Node B 110a-d, and sending the transport blocks to RNC 112a-b via Iub interface 114. RNC 112a-b, however, is typically configured to drop the transport blocks having their corresponding CRCI set to "1" thereby indicating errors. Consequently, communication of transport blocks having errors may unnecessarily consume bandwidth on Iub Interface 114.

These and other problems may be solved by one or more embodiments. For example, Iub interface 114 as implemented by Node B 110a-d and RNC 112a-b may be modified to reduce or eliminate the communication of transport blocks having errors. Node B 110a-d may perform error detection on data frames received from ME 104a-c, and set a CRCI bit for each transport block in the data frames. Node B 110a-d may then forward the data frames with the CRCI bits but without the transport blocks containing errors. By sending only CRCI bits without incorrect transport blocks on Iub interface 114, Node B 110 could significantly preserve Iub bandwidth.

Figure 2:
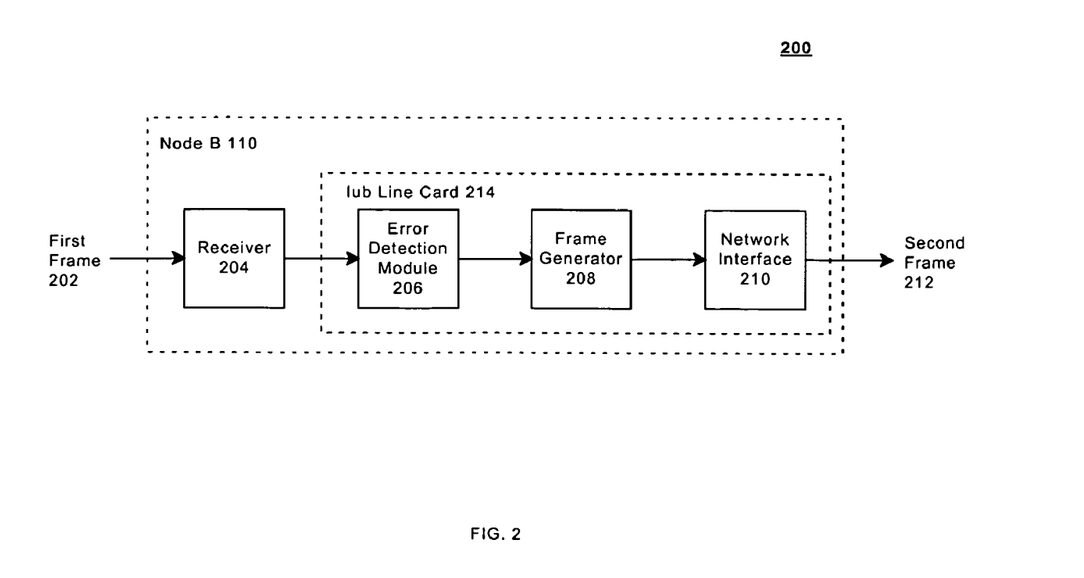
FIG. 2 illustrates a partial block diagram of a Node B 100.

FIG. 2 illustrates a partial block diagram of a Node B 110. Node B 110 may be representative of, for example, any of Node B 110a-d. As shown in FIG. 2, Node B 110 may comprise multiple elements, such as a receiver 204 and an Iub line card 214. Some elements may be implemented using, for example, one or more circuits, components, registers, processors, software subroutines, or any combination thereof. Although FIG. 2 shows a limited number of elements, it can be appreciated that more or less elements may be used in Node B 110 as desired for a given implementation. The embodiments are not limited in this context.

In one embodiment, Node B 110 may include receiver 204. Receiver 204 may comprise a radio receiver to receive radio signals from ME 104a-c. Receiver 204 may be arranged to receive Uu interface traffic in accordance with the Uu Specification. More particularly, receiver 204 may receive a first frame 202 from ME 104a-c. First frame 202 may be representative of the framing protocol (FP) frames communicated between Node B 110 and ME 104. First frame 202 may include multiple transport blocks. Receiver 204 may forward first frame 202 to Iub line card 214 for processing and transport to RNC 112a-b.

In one embodiment, Node B 110 may include Iub line card 214. Iub line card 206 may process the Iub interface traffic with RNC 112 in accordance with the Iub Specification. Iub line card 206 may include an error detection module 206, a frame generator 208, and network interface 210.

Error detection module 206 may perform error detection on each data frame received from receiver 204. Error detection module may perform the error detection using any number of error detection techniques, such as CRC, for example. Error detection module 206 may generate an error indicator value to indicate whether each transport block contains an error or does not contain an error. An example of an error indicator value may comprise a CRCI bit. Error detection module may output a CRCI bit for each transport block to frame generator 208.

Frame generator 208 may generate a second frame 212. Second frame 212 may include transport blocks from first frame 202 that do not contain an error, and the CRCI bits for all the transport blocks received in first frame 202 from ME 104a-c. Frame generator 208 may output second frame 212 for transport to RNC 112a-b via network interface 210.

In operation, Iub line card 214 may preserve bandwidth on Iub interface 114 by not sending erroneous transport blocks between Node B 110*a-d* and RNC 112*a-b* in UMTS 100. RNC 112*a-b* may be arranged to drop erroneous transport blocks received from Node B 110*a-d*, and is typically arranged to perform such operations by default. Iub line card 214 may therefore be arranged to send only correct transport blocks and appropriately set CRCI bits in the data frame as a notification that the corresponding transport block contained an error. This can save a significant amount of bandwidth on Iub interface 114, which could allow more calls to be handled using the same physical Iub interface 114 and improve overall performance for UMTS 100.

Figure 3:
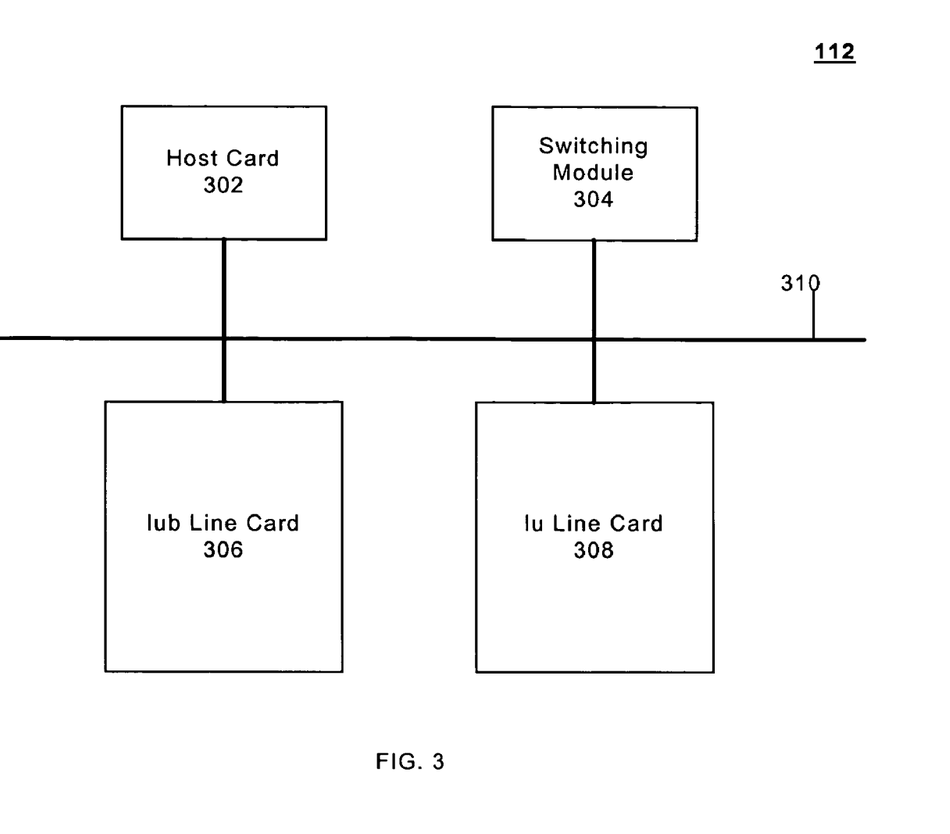
FIG. 3 illustrates a partial block diagram of a radio network controller 112.

FIG. 3 illustrates a partial block diagram of a RNC 112. RNC 112 may be representative of, for example, any of RNC 112*a-b*. As shown in FIG. 3, RNC 112 may comprise multiple elements. Some elements may be implemented using, for example, one or more circuits, components, registers, processors, software subroutines, or any combination thereof. Although FIG. 3 shows a limited number of elements, it can be appreciated that more or less elements may be used in RNC 112 as desired for a given implementation. The embodiments are not limited in this context.

In one embodiment, RNC 112 may comprise a host card 302, an Ethernet switching module 304, an Iub line card 306 and an Iu line card 308, all connected via a high-speed Ethernet back plane 310. Iub line card 306 may process the Iub interface traffic, such as second frame 212, from Node B 110 in accordance with the Iub Specification. Iu line card 308 may process Iu interface traffic from CN 120 in accordance with the Iu Specification. Iub line card 306 and Iu line card 308 may use one or more processors to execute the data plane protocols and control plane protocols (e.g., signaling protocols). Host card 302 may execute the RNC application and additional signaling protocols. Ethernet switching module 304 may switch packets of information between host card 302 and line cards 306/308 via high-speed Ethernet back plane 310.

In operation, Iub line card 306 may receive the data frames (e.g., second frame 212) from Node B 110*a-d*. Iub line card 306 may retrieve the CRCI for each transport block, and use the CRCI to determine which transport blocks have been removed or dropped from the original data frame received by Node B 110*a-d*. The operations of Node B 110 may be described in further detail with reference to FIGS. 4-7.

Figure 4:
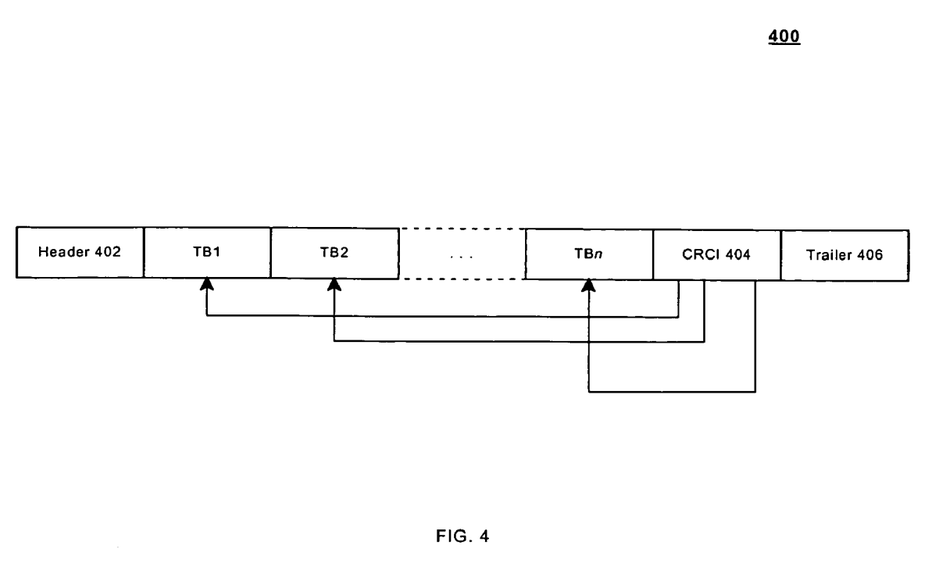
FIG. 4 illustrates a frame 400.

FIG. 4 illustrates a frame 400. Frame 400 may represent a partial frame structure for a FP uplink (UL) frame for dedicated channels (DCH). It is worthy to note that the embodiments are not limited to DCH, and but may also apply to all UMTS channels carrying transport blocks and corresponding CRCI bits. The embodiments are not limited in this context.

Frame 400 may be representative of the FP frames exchanged between Node B 110 and RNC 112 via Iub interface 114 before transport blocks with errors have been removed. As shown in FIG. 4, frame 400 may comprise a header field 402, transport blocks TB1-n, CRCI field 404, and trailer field 406. Transport blocks TB1-n may be in an ordered sequence. CRCI field 404 may be used to transport a CRCI value for each transport block TB1-n. The CRCI value may indicate whether the corresponding transport block is error-free (e.g., value 0) or contains an error (e.g., value 1).

Frame 400 may be representative of a FP frame before removing the transport blocks that contain an error. Error detection module 206 may generate a CRCI for each transport block TB1-n, where there are n CRCI bits generated for n transport blocks. Sending frame 400 in its current form, however, may unnecessarily consume bandwidth on Iub interface 114 for the transport blocks containing errors.

Figure 5:
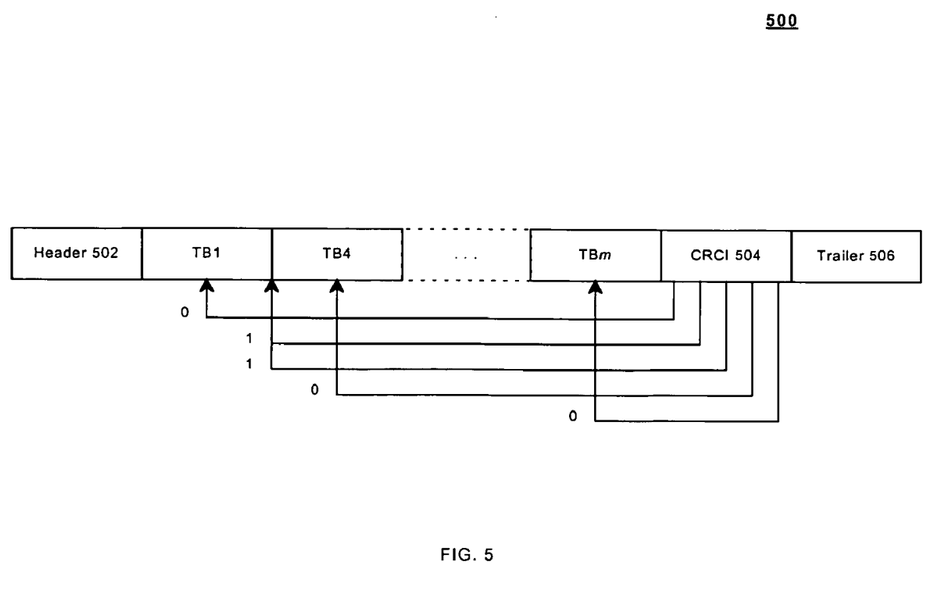
FIG. 5 illustrates a frame 500.

FIG. 5 illustrates a frame 500. Frame 500 may be representative of a FP frame such as frame 400 after removing the transport blocks that contain an error. As shown in FIG. 5, frame 500 may be similar in frame structure to frame 400, and includes a header 502, transport blocks TB1-m, CRCI field 504, and trailer 506. In frame 500, however, the transport blocks that contain an error may be removed, and therefore frame 500 may have less transport blocks m than transport blocks n of frame 400. CRCI field 504 may still retain, however, the n CRCI bits for each transport block TB1-n.

Iub line card 306 of RNC 112 may receive frame 500 from Node B 110*a-d*. Iub line card 306 may use the n CRCI bits to determine whether to take the corresponding TB1-m from frame 500 if the CRCI bit is set to 0, or not to expect a missing transport block and mark it as containing an error if the CRCI bit is set to 1. As shown in FIG. 5, for example, the CRCI bit for TB1 is set to 0 and TB1 is present in frame 500. The CRCI bits for TB2 and TB3, however, are both set to 1 and are not present in frame 500, thus preserving bandwidth for Iub interface 114. The CRCI bit for TB4 is set to 0 and TB4 is present in frame 500. This technique may apply to all transport blocks TBm for frame 500.

Figure 6:
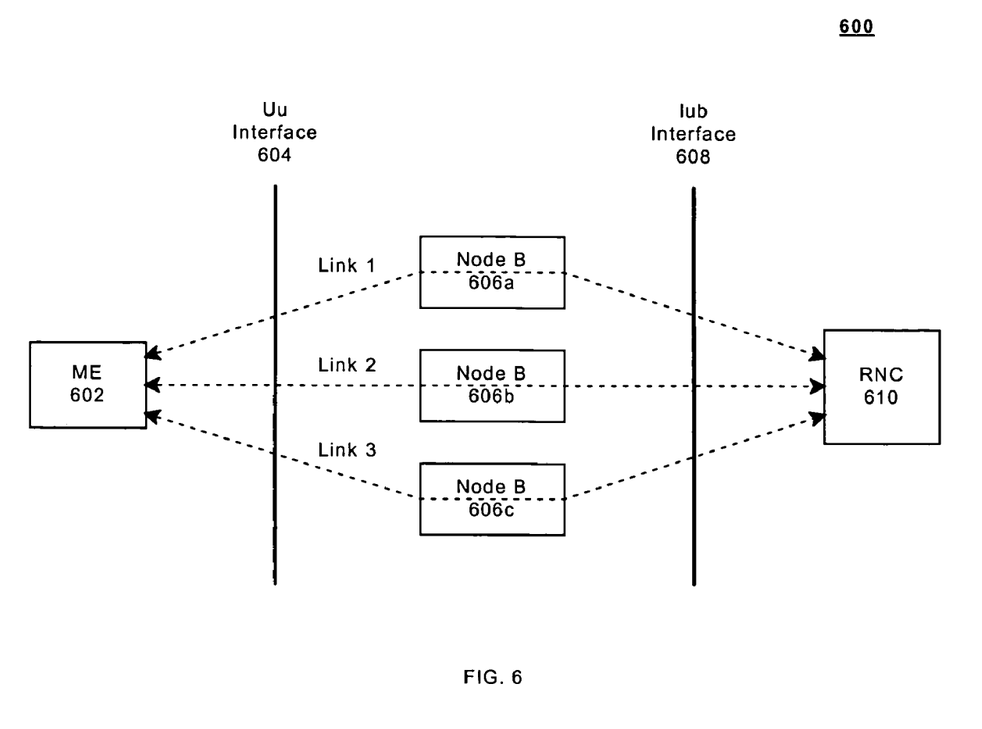
FIG. 6 illustrates an example of macro-diversity for a system 600.

FIG. 6 illustrates an example of macro-diversity for a system 600. The embodiments may provide several advantages over conventional techniques. One example may be presented using FIG. 6. As shown in FIG. 6, system 600 may include ME 602, node B 606*a-c*, and RNC 610. ME 602 may have radio connections 1-3 to node B 606*a*, node B 606*b*, and node B 606*c*, respectively, over Uu interface 604. Node B 606*a-c* may connect to RNC 610 via Iub interface 608.

The embodiments may result in preserving bandwidth for Iub interface 608 for UMTS 600, particularly when macro-diversity techniques are used. For example, assume that links 2 and 3 are low quality radio connections, and therefore a higher number of transport blocks (e.g., 1 in 3) are received by node B 606*b* and node B 606*c*, respectively, with errors. Further assume that link 1 is a higher quality radio connection (e.g., BER<$10^{-6}$), and therefore a lower number of transport blocks are received by node B 606*a* with errors. In such a case, approximately 22% of the Iub bandwidth for Iub interface 608 may be preserved by removing transport blocks with errors from the data frames. This figure could be much higher for lower quality links, which typically occur in areas where signal interference is particularly high, such as in a city or other densely populated area.

Operations for the above system and subsystem may be further described with reference to the following figures and accompanying examples. Some of the figures may include programming logic. Although such figures presented herein may include a particular programming logic, it can be appreciated that the programming logic merely provides an example of how the general functionality described herein can be implemented. Further, the given programming logic does not necessarily have to be executed in the order presented unless otherwise indicated. In addition, the given programming logic may be implemented by a hardware element, a software element executed by a processor, or any combination thereof. The embodiments are not limited in this context.

Figure 7:
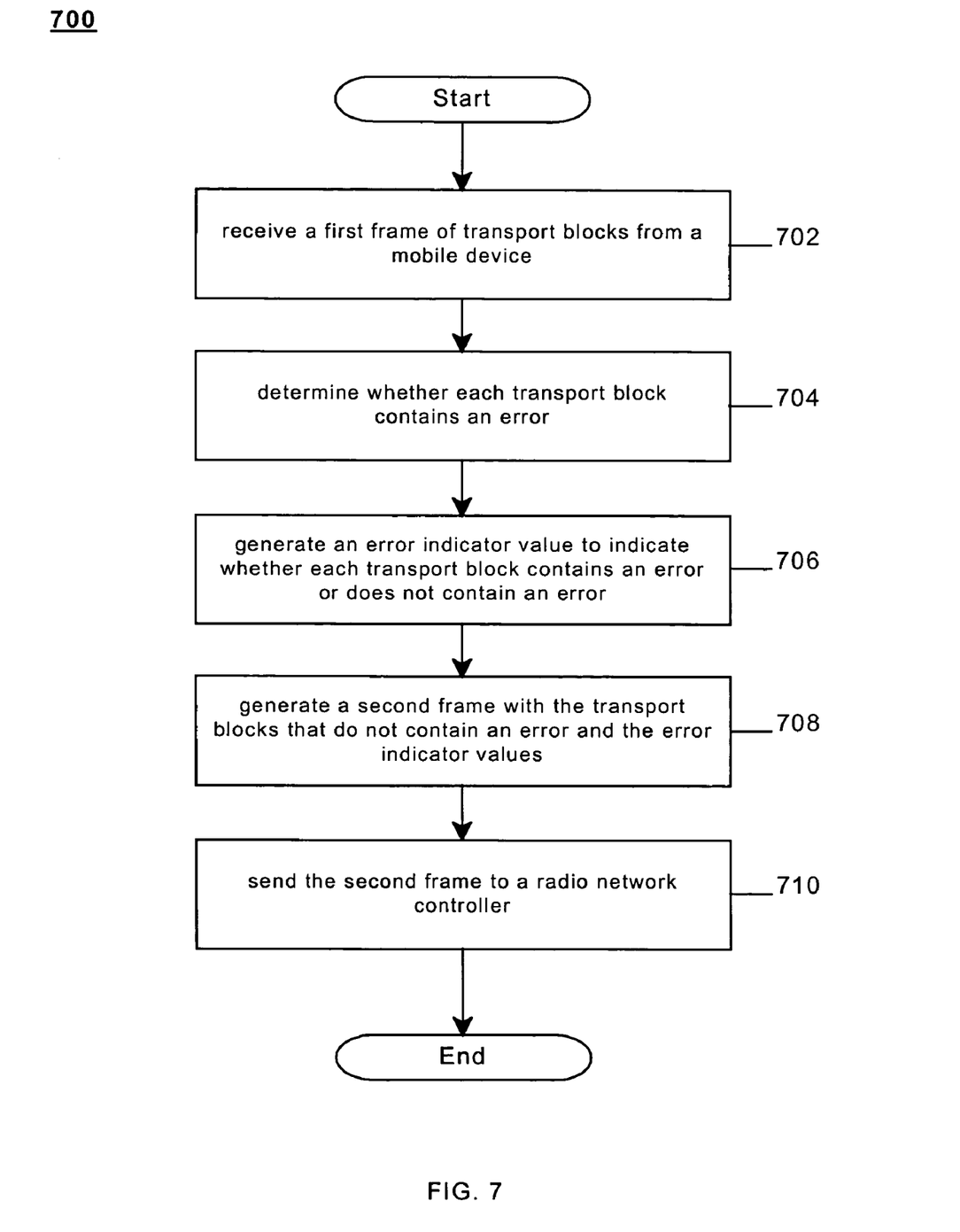
FIG. 7 illustrates a programming logic 700.

FIG. 7 illustrates a programming logic 700. Programming logic 700 may be representative of the operations executed by one or more systems described herein, such as system 100, Node B 110, and/or RNC 112. As shown in programming logic 700, a first frame of transport blocks may be received from a mobile device at block 702. A determination may be made as to whether each transport block contains an error at block 704. An error indicator value may be generated to indicate whether each transport block contains an error or does not contain an error at block 706. The error indicator value may comprise, for example, a CRCI bit. A second frame may be generated with said transport blocks that do not contain an error and said error indicator values at block 708. The second frame may be sent to a RNC at block 710.

In one embodiment, an n number of CRCI bits may be generated for n transport blocks. The second frame may include the n CRCI bits and m transport blocks, where n is greater than m.

In one embodiment, each transport block sent with the first frame may have a sequence number. In this case, the RNC may receive the second frame and retrieve the CRCI bits. The RNC may determine which transport blocks in the sequence of transport blocks sent with the first frame have been omitted from the second frame using the error indicator values. For example, the CRCI bits may be set to 1 to indicate a transport block has an error, and set to 0 to indicate a transport block does not have an error.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an application specific integrated circuit (ASIC), Programmable Logic Device (PLD) or digital signal processor (DSP), and so forth. In yet another example, an embodiment may be implemented by any combination of programmed general-purpose computer components and custom hardware components. The embodiments are not limited in this context.

Some embodiments may use one or more network processors, such as for line cards 206 and 208 of Node B 110, and line cards 306 and 308 of RNC 112, for example. The network processor may comprise, for example, a network processor from the Intel® IXP series of network processors made by Intel Corporation. The Intel IXP series of network processors may contain multiple processing elements, such as multiple microengines and a processor core. The processing core may be, for example, an Intel StrongARM® Core (ARM is a trademark of ARM Limited, United Kingdom). The processor core may also include a central controller that assists in loading code for other resources of the network processor, for example, and performs other general-purpose computer type functions such as handling protocols, exceptions and extra support for packet processing. The microengines may include memory that may have the capability to store instructions, for example. For example, in one embodiment there may be sixteen microengines, with each microengine having the capability to process eight program threads. The embodiments are not limited in this context.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus to preserve bandwidth in a communication system, comprising:
   a receiver to receive a first frame of transport blocks from a mobile device;
   an error detection module to connect to said receiver, said error detection module to detect whether each transport block contains an error, and generate an error indicator value to indicate whether each transport block contains an error or does not contain an error;
   a frame generator to connect to said error detection module, said frame generator to generate a second frame with said transport blocks that do not contain an error and without said transport blocks that do contain an error, said second frame having error indicator values representing said transport blocks that do contain an error and said error indicator values;
   a first network interface to send said second frame to a radio network controller.

2. The apparatus of claim 1, wherein said error indicator value comprises a cyclic redundancy check indicator bit, and said error detection module is arranged to generate n cyclic redundancy check bits for n transport blocks.

3. The apparatus of claim 1, wherein said error indicator value comprises a cyclic redundancy check indicator bit, and said frame generator is arranged to generate said second frame with n cyclic redundancy check bits and m transport blocks, where n is greater than m.

4. The apparatus of claim 1, wherein each transport block sent with said first frame has a sequence number, and further comprising a second network interface to receive said second frame, retrieve said error indicator values, and determine which transport blocks in said sequence of transport blocks sent with said first frame have been omitted from said second frame using said error indicator values.

5. The apparatus of claim 1, wherein said error indicator value indicator is set to one to indicate a transport block has an error, and set to zero to indicate a transport block does not have an error.

6. The apparatus of claim 4, wherein said first network interface and said second network interface comprise Iub interfaces as defined by an Iub Specification.

7. A system to preserve bandwidth in a communication system, comprising:
   a mobile device to send a first frame of transport blocks;

a base station comprising:
  an antenna;
  a receiver to connect to said antenna, said receiver to receive said first frame from said antenna;
  an error detection module to connect to said receiver, said error detection module to detect whether each transport block contains an error, and generate an error indicator value to indicate whether each transport block contains an error or does not contain an error;
  a frame generator to connect to said error detection module, said frame generator to generate a second frame with said transport blocks that do not contain an error and without said transport blocks that do contain an error, said second frame having error indicator values representing said transport blocks that do contain an error and said error indicator values;
  a first network interface to send said second frame.

8. The system of claim 7, wherein said error indicator value comprises a cyclic redundancy check indicator bit, and said error detection module is arranged to generate n cyclic redundancy check bits for n transport blocks.

9. The system of claim 7, wherein said error indicator value comprises a cyclic redundancy check indicator bit, and said frame generator is arranged to generate said second frame with n cyclic redundancy check bits and m transport blocks, where n is greater than m.

10. The system of claim 7, wherein each transport block sent with said first frame has a sequence number, and further comprising:
  a radio network controller having a second network interface, said second network interface to receive said second frame, retrieve said error indicator values, and determine which transport blocks in said sequence of transport blocks sent with said first frame have been omitted from said second frame using said error indicator values.

11. A method to preserve bandwidth in a communication system, comprising:
  receiving a first frame of transport blocks from a mobile device;
  determining whether each transport block contains an error;
  generating an error indicator value to indicate whether each transport block contains an error or does not contain an error;
  generating a second frame with said transport blocks that do not contain an error and without said transport blocks that do contain an error, said second frame having error indicator values representing said transport blocks that do contain an error and said error indicator values; and
  sending said second frame to a radio network controller.

12. The method of claim 11, wherein said error indicator value comprises a cyclic redundancy check indicator bit, and said generating comprises generating n cyclic redundancy check bits for n transport blocks.

13. The method of claim 11, wherein said error indicator value comprises a cyclic redundancy check indicator bit, and said second frame comprises n cyclic redundancy check bits for m transport blocks, where n is greater than m.

14. The method of claim 11, wherein each transport block sent with said first frame has a sequence number, further comprising:
  receiving said second frame;
  retrieving said error indicator values; and
  determining which transport blocks in said sequence of transport blocks sent with said first frame have been omitted from said second frame using said error indicator values.

15. The method of claim 11, wherein said error indicator value indicator is set to one to indicate a transport block has an error, and set to zero to indicate a transport block does not have an error.

16. An article to preserve bandwidth in a communication system, comprising:
  a storage medium;
  said storage medium including stored instructions that, when executed by a processor, are operable to receive a first frame of transport blocks from a mobile device, determine whether each transport block contains an error, generate an error indicator value to indicate whether each transport block contains an error or does not contain an error, generate a second frame with said transport blocks that do not contain an error and without said transport blocks that do contain an error, said second frame having error indicator values representing said transport blocks that do contain an error and said error indicator values, and send said second frame to a radio network controller.

17. The article of claim 16, wherein said error indicator value comprises a cyclic redundancy check indicator bit, and said generating comprises generating n cyclic redundancy check bits for n transport blocks.

18. The article of claim 16, wherein said error indicator value comprises a cyclic redundancy check indicator bit, and said second frame comprises n cyclic redundancy check bits for m transport blocks, where n is greater than m.

19. The article of claim 16, wherein each transport block sent with said first frame has a sequence number, and the stored instructions, when executed by a processor, are further operable to receive said second frame, retrieve said error indicator values, and determine which transport blocks in said sequence of transport blocks sent with said first frame have been omitted from said second frame using said error indicator values.

20. The article of claim 16, wherein said error indicator value indicator is set to one to indicate a transport block has an error, and set to zero to indicate a transport block does not have an error.

* * * * *